(12) United States Patent
Eom et al.

(10) Patent No.: US 11,474,588 B2
(45) Date of Patent: Oct. 18, 2022

(54) METHOD AND APPARATUS FOR CONTROLLING POWER EFFICIENCY OF PROCESSOR BASED ON POLLING I/O

(71) Applicant: RESEARCH & BUSINESS FOUNDATION SUNGKYUNKWAN UNIVERSITY, Suwon-si (KR)

(72) Inventors: Young Ik Eom, Suwon-si (KR); Yong Ju Song, Suwon-si (KR); Sungwoo Lee, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 9 days.

(21) Appl. No.: 17/210,556

(22) Filed: Mar. 24, 2021

(65) Prior Publication Data
US 2021/0303057 A1 Sep. 30, 2021

(30) Foreign Application Priority Data
Mar. 26, 2020 (KR) .................. 10-2020-0036830

(51) Int. Cl.
*G06F 1/3234* (2019.01)
*G06F 1/3228* (2019.01)
*G06F 1/324* (2019.01)

(52) U.S. Cl.
CPC ............ *G06F 1/3243* (2013.01); *G06F 1/324* (2013.01); *G06F 1/3228* (2013.01)

(58) Field of Classification Search
CPC ...... G06F 1/3228; G06F 1/324; G06F 1/3243; G06F 1/3278; G06F 1/3221; Y02D 10/00
See application file for complete search history.

(56) References Cited

U.S. PATENT DOCUMENTS

| 5,239,652 A * | 8/1993 | Seibert | G06F 1/3228 713/323 |
| 6,076,171 A * | 6/2000 | Kawata | G06F 1/08 713/322 |
| 7,093,141 B2 * | 8/2006 | Elnozahy | G06F 1/3209 713/323 |
| 8,706,652 B2 * | 4/2014 | Yang | G06Q 10/04 709/224 |

(Continued)

FOREIGN PATENT DOCUMENTS

| KR | 10-0550195 B1 | 2/2006 |
| KR | 10-2017-0049195 A | 5/2017 |

OTHER PUBLICATIONS

Korean Office Action dated Aug. 25, 2021 in counterpart Korean Patent Application No. 10-2020-0036830 (5 pages in Korean).

*Primary Examiner* — Chun Cao
(74) *Attorney, Agent, or Firm* — NSIP Law

(57) ABSTRACT

In accordance with an aspect of the present disclosure, there is provided a method of controlling power efficiency of a processor based on polling I/O. The method comprises checking at every predetermined time period whether a polling count is generated by a polling I/O operation for checking for a completion in response to an I/O request in storage; when it is checked that no polling count is generated, resetting a maximum frequency of the processor to have a default value; and converting a current operation frequency of the processor based on the polling count and an I/O sensitivity of the processor, when it is checked that the polling count is generated.

20 Claims, 9 Drawing Sheets

(56) References Cited

U.S. PATENT DOCUMENTS

| | | | |
|---|---|---|---|
| 2004/0163000 A1* | 8/2004 | Kuhlmann | G06F 1/3203 |
| | | | 713/300 |
| 2012/0030389 A1* | 2/2012 | Ishikawa | G06F 13/4054 |
| | | | 710/110 |
| 2013/0205149 A1* | 8/2013 | Chen | G06F 1/3225 |
| | | | 713/322 |
| 2016/0034013 A1* | 2/2016 | Kim | G06F 1/3228 |
| | | | 713/320 |
| 2020/0218676 A1* | 7/2020 | Cao | G06F 13/1668 |

* cited by examiner

METHOD AND APPARATUS FOR CONTROLLING POWER EFFICIENCY OF PROCESSOR BASED ON POLLING I/O

CROSS-REFERENCE TO RELATED APPLICATION

This application claims priority to Korean Patent Application No. 10-2020-0036830, filed on Mar. 26, 2020, the entire contents of which are incorporated herein by reference.

TECHNICAL FIELD

The present disclosure relates to a method and apparatus for controlling power efficiency based on polling I/O.

BACKGROUND

With the advent and popularization of ultra-high performance storage devices which offer higher performance than existing storage, the speed of storage used in mobile devices is improving. However, this development is not being taken into account in the existing mobile operating systems, making it difficult to fully utilize the performance of high performance storage.

FIG. 1 is a view showing conventional interrupt-based I/O.

An interrupt-based I/O service asynchronously handles all I/O requests. While I/O data is being handled inside a storage device, a process by which the I/O request has been submitted goes into a sleep state until the I/O handling is done. At this point, the CPU scheduler hands the task over to another CPU or switches to a low power mode to reduce power consumption. Afterwards, once the I/O request handling is done, the CPU resumes the interrupted task. This technique provides fast I/O response time but requires less CPU resources.

In this way, in the conventionally used interrupt-based I/O, when an I/O is sent to a storage device by a process, other I/O tasks are allocated, or the CPU is switched to the low power mode, until the I/O processing is done. However, the task allocation and the mode transition create overhead. Such overhead takes up a large proportion of the total time as the response time is shortened, which is a more serious problem for high-performance storage.

FIG. 2 is a view showing conventional polling I/O.

In the conventional polling I/O, as opposed to the existing interrupt-based I/O, the operating system restlessly checks whether a storage device has completed an I/O request or not. In this approach, the operating system neither goes into a context switch nor goes into a sleep mode. Hence, this approach is efficient for reducing the I/O response time of the system and increasing the throughput. However, the CPU constantly checks the storage device, thus causing a considerable amount of CPU resource consumption.

As such, the polling I/O has no task switching overhead, as opposed to the interrupt-based I/O, and therefore delivers higher performance than the interrupt-based I/O with the same CPU clock rate (frequency). In this case, a CPU governor, which is one of the conventional technologies for controlling power consumption efficiency by tuning CPU frequency, does not take the polling I/O into consideration at all. Therefore, even if the polling I/O is performed, the advantage of higher performance relative to power consumption cannot be achieved.

Meanwhile, with the advent and popularization of ultra-high performance storage devices which offer higher performance than existing storage, ultra-high performance storage becomes more frequently used in mobile devices as well. However, the short response time of the ultra-high performance storage devices has not been taken into consideration in the existing mobile operating systems, making it difficult to fully utilize their high performance capabilities. To solve this problem, the polling I/O, which constantly checks whether a task is completed or not, is attracting attention, replacing the interrupt-based I/O which allocates different tasks to the CPU during an I/O operation.

Moreover, efforts are underway to reduce power consumption in order to increase the usage time of mobile devices. Among these efforts is the CPU governor technology which controls the CPU's performance and the CPU's power consumption efficiency by converting the CPU's frequency. That is, mobile devices use the conventional CPU governor, which is a technology for controlling CPU power efficiency, in order to increase usage time. However, the conventional CPU governor does not take into account that the polling I/O is optimized for short response time. Despite the increase in the performance of mobile storage devices, no optimization is being done.

SUMMARY

The problem to be solved by the present disclosure provide a method and apparatus for controlling power efficiency based on polling I/O, in order to improve the power efficiency of a processor by taking into account the characteristics of polling I/O which is suitable for the increasing performance of storage devices.

In accordance with an aspect of the present disclosure, there is provided a method of controlling power efficiency based on polling I/O. The method comprises, checking at every predetermined time period whether a polling count is generated by a polling I/O operation for checking for a completion in response to an I/O request in storage; when it is checked that no polling count is generated, resetting a maximum frequency of the processor to have a default value; and converting a current operation frequency of the processor based on the polling count and an I/O sensitivity of the processor, when it is checked that the polling count is generated.

In accordance with another aspect of the present disclosure, there is provided an apparatus for controlling power efficiency based on polling I/O. The apparatus comprises storage for handling an I/O request; memory connected to the storage; the processor connected to the storage and the memory, for checking whether the I/O request has been handled or not based on polling I/O; and a controller for adjusting a frequency of the processor, wherein the controller checks at every predetermined time period whether a polling count is generated by a polling I/O operation for checking for a completion in response to an I/O request in the storage, when the controller checks that no polling count is generated, resets a maximum frequency of the processor to have a default value, and converts the frequency of the processor based on the polling count and an I/O sensitivity of the processor, when the controller checks that the polling count is generated.

The controlling power efficiency based on polling I/O apparatus and method according to the embodiments of the present disclosure allow for detecting a polling I/O operation without the use of additional equipment by improving the CPU governor, which is a conventional technology, thus lowering the maximum CPU frequency supported by the CPU.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
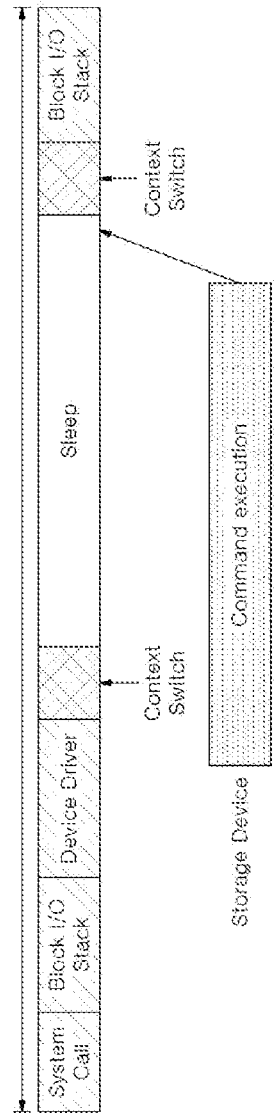
FIG. 1 is a view showing conventional interrupt-based I/O.
Figure 2:
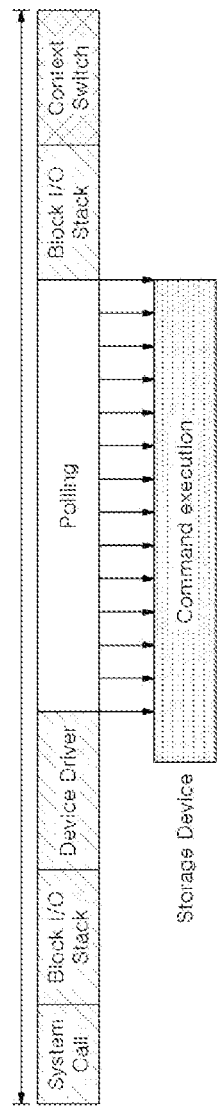
FIG. 2 is a view showing conventional polling I/O.
Figure 3:
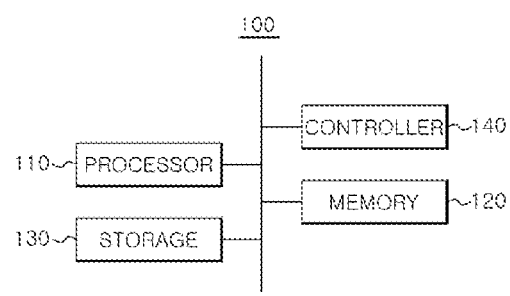
FIG. 3 is a block diagram illustrating a construction of an apparatus for controlling power efficiency based on polling I/O according to an exemplary embodiment of the present disclosure.

FIG. 3 is a block diagram illustrating a construction of an apparatus for controlling power efficiency based on polling I/O according to an exemplary embodiment of the present disclosure.

As depicted in FIG. 3, the polling I/O-based power efficiency controlling apparatus 100 includes a processor 110, memory 120, storage 130, and a controller 140. However, not all of the illustrated elements are essential. The apparatus 100 for controlling power efficiency based on polling I/O may be embodied by more or fewer elements than illustrated.

Hereinafter, detailed components and operations of each of the elements of the apparatus 100 for controlling power efficiency based on polling I/O shown in FIG. 3 will be described.

The storage 130 handles an input/output (I/O) request from the polling I/O-based power efficiency controlling apparatus 100.

The memory 120 is connected to the storage 130 and the processor 110. The memory 120 stores at least one program that allows the controller 140 to execute a method for controlling power efficiency based on polling I/O.

The processor 110 is connected to the storage 130 and the memory 120, and checks whether an I/O request has been handled or not based on polling I/O. The processor 110 may be a central processing unit (CPU).

The controller 140 adjusts the frequency of the processor 110 by executing at least one program. The controller 140 checks whether a polling count is generated by a polling I/O operation for checking for the completion of an I/O request in the storage 130. If no polling count is generated, the maximum frequency of the processor 110 is reset, and if a polling count is generated, the controller 140 converts the frequency of the processor 110 by comparing the generated polling count with I/O sensitivity. The controller 140 may include a kernel part. The kernel part may be embodied as a processor different from the processor 110.

The I/O sensitivity is represented as an amount of data to be monitored for converting the frequency of the processor, in relation to how often the frequency of the processor 110 is converted by a Pollo technique. In this case, the higher the set I/O frequency, the greater the amount of data to be monitored before the frequency conversion, and hence the frequency conversion cycle of the processor 110 is lengthened.

As such, the polling I/O-based power efficiency controlling apparatus 100 may in a stepwise manner control power efficiency in accordance with the amount of polling I/O. Upon detecting a polling I/O operation, the power frequency controlling apparatus 100 may use a lower frequency for the processor 110 to ensure higher performance than the conventional interrupt-based I/O and reduce power consumption. Also, the power efficiency controlling apparatus 100 may enhance performance by increasing the frequency (CPU frequency) of the processor 110.

According to the exemplary embodiments of the present disclosure, the controller 140 may check whether the utilization of the processor 110 exceeds a threshold or not.

According to the exemplary embodiments of the present disclosure, if the utilization of the processor 110 exceeds a threshold, the controller 140 may check whether a polling count is generated or not.

According to the exemplary embodiments of the present disclosure, if the utilization of the processor 110 is equal to or below the threshold, the controller 140 may reset the polling count and the maximum frequency.

According to the exemplary embodiments of the present disclosure, if the generated polling count is equal to or less than a multiple of the I/O sensitivity, the controller 140 may convert the maximum frequency of the processor 110 into a Pollo frequency, which is the minimum frequency of the processor 110 showing higher performance than interrupt-based I/O.

According to the exemplary embodiments of the present disclosure, if the generated polling count exceeds a multiple of the I/O sensitivity, the controller 140 may convert the Pollo frequency in a stepwise manner, which is the minimum frequency of the processor 110 showing higher performance than interrupt-based I/O.

According to the exemplary embodiments of the present disclosure, if the generated polling count exceeds a multiple of the I/O sensitivity, the controller 140 may convert the Pollo frequency by a multiple of the I/O sensitivity.

According to the exemplary embodiments of the present disclosure, the lower the I/O sensitivity, the higher the rate of increase in Pollo frequency, and the higher the I/O frequency, the lower the rate of increase in Pollo frequency.

According to the exemplary embodiments of the present disclosure, the polling count may include the presence or absence of a polling operation, the number of polling operations, and the amount of data polled by a completed polling operation.

According to the exemplary embodiments of the present disclosure, the controller 140 may adjust the I/O sensitivity in accordance with the performance of the processor 110 set by the user.

As such, the polling I/O-based power efficiency controlling apparatus 100 is an enhanced CPU on-demand governor designed to lower power utilization by lowering the CPU frequency for polling I/O without the use of additional equipment. An on-demand governor mainly used as a primary CPU governor controls the CPU frequency in accordance with the utilization of the CPU. In this case, upon detecting a polling I/O operation, the polling I/O-based power efficiency controlling apparatus 100 may lower the frequency for polling operation by lowering the maximum frequency for CPU operation. Also, the polling I/O-based power efficiency controlling apparatus 100 may enhance the execution performance by increasing the maximum frequency as the amount of polling I/O increases later.

Figure 4:
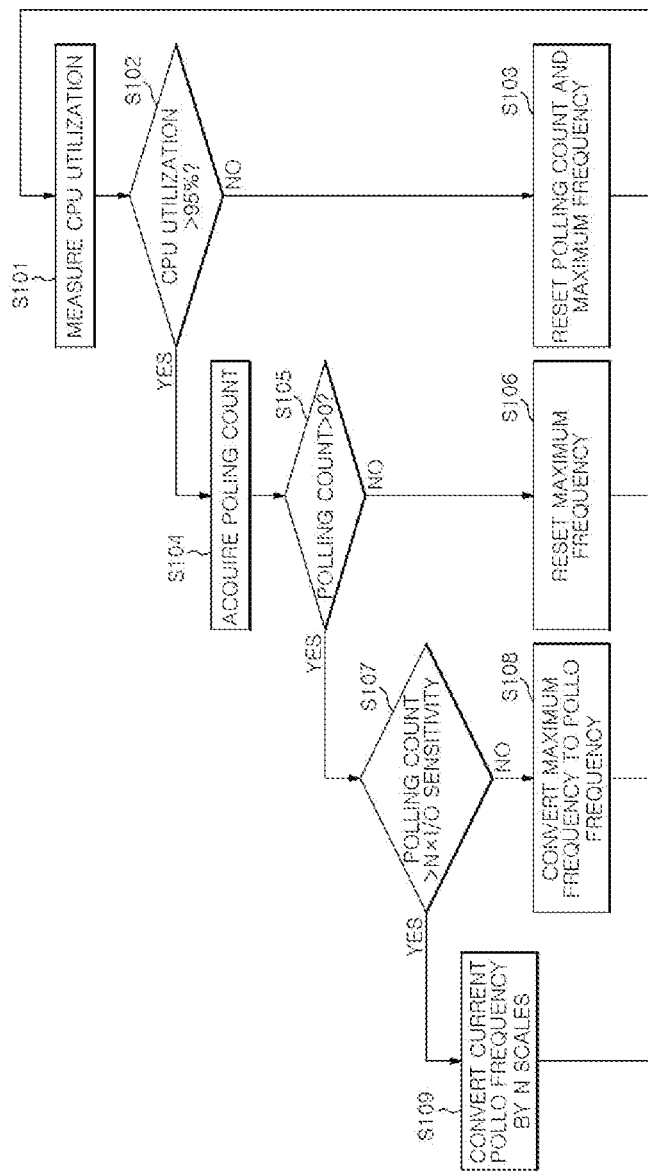
FIG. 4 is a flowchart showing a method for controlling power efficiency based on polling I/O according to an exemplary embodiment of the present disclosure.

FIG. 4 is a flowchart showing a method for controlling power efficiency based on polling I/O according to an exemplary embodiment of the present disclosure.

In the step S101, the power efficiency controlling apparatus 100 measures the utilization of the processor 110.

In the step S102, the power efficiency controlling apparatus 100 checks whether the utilization of the processor 110 exceeds a preset threshold (e.g., 95%) or not.

In the step S103, if the utilization of the processor 110 is equal to or below the preset threshold, the power efficiency controlling apparatus 100 resets the polling count and the maximum frequency.

In the step S104, if the utilization of the processor 110 exceeds the preset threshold, the power efficiency controlling apparatus 100, the power efficiency controlling apparatus 100 acquires a polling count.

In the step S105, the power efficiency controlling apparatus 100 checks whether a polling count is generated or not. That is, the power efficiency controlling apparatus 100 checks whether a polling count is generated by a polling I/O operation for checking whether the storage 130 has handled an I/O request or not.

In the step S106, if no polling count is generated, the power efficiency controlling apparatus 100 resets the maximum frequency of the processor 110.

In the step S107, if a polling count is generated, the power efficiency controlling apparatus 100 checks whether the amount of data polled by polling in the polling count exceeds a multiple of the I/O sensitivity. Here, the power efficiency controlling apparatus 100 may adjust the I/O sensitivity in accordance with the performance of the processor 110 set by the user.

In the step S108, if the generated polling count is equal to or less than a multiple of the I/O sensitivity, the power efficiency controlling apparatus 100 may convert the maximum frequency of the processor 110 to a Pollo frequency, which is the minimum frequency of the processor 110 showing higher performance than interrupt-based I/O.

In the step S109, if the generated polling count exceeds a multiple of the I/O sensitivity, the power efficiency controlling apparatus 100 may convert the Pollo frequency by n scales which are a multiple of the I/O sensitivity. That is, if the generated polling count exceeds a multiple of the I/O sensitivity, the power efficiency controlling apparatus 100 may convert the Polio frequency in a stepwise manner, which is the minimum frequency of the processor 110 showing higher performance than interrupt-based I/O.

As such, the power efficiency controlling apparatus 100 may convert the frequency of the processor 110 by comparing the generated polling count with the I/O sensitivity. The lower the I/O sensitivity, the higher the rate of increase in Polio frequency, and the higher the I/O frequency, the lower the rate of increase in Polio frequency.

Meanwhile, the power efficiency controlling apparatus 100 according to an exemplary embodiment of the present disclosure may reduce power consumption by lowering the maximum CPU frequency that can be tuned for the CPU each time a polling I/O operation is executed by a process. Also, upon determining that higher performance is required depending on the amount of I/O being executed, the power efficiency controlling apparatus 100 may offer the performance required by the user by scaling up the maximum CPU frequency again.

In an exemplary embodiment of the present disclosure, the presence or absence of a polling I/O operation may be checked by using the polling count (poll_count) parameter and CPU utilization added to an on-demand governor.

Since polling uses most of the CPU utilization, the power efficiency controlling apparatus 100 does a comparison based on CPU utilization first. If the CPU utilization does not exceed 95%, the power efficiency controlling apparatus 100 may reset the polling count (poll_count) and the CPU frequency, so that the CPU runs like it does in the conventional art if there is no polling I/O being executed.

Moreover, the polling count (poll_count) is an integer-type parameter, which serves to check not only the presence or absence of a polling operation, but also the number of polling operations and the amount of polled data. The polling count (poll_count) increases by 1 each time a function blk_mq_poll( ) is executed to check whether the storage 130 has completed an I/O or not. The power efficiency controlling apparatus 100 may measure the number of polling I/O operations that have been executed.

The on-demand governor, which runs in the power efficiency controlling apparatus 100 according to an exemplary embodiment of the present disclosure, may invoke an od_update( ) function and measure the current CPU utilization at fixed intervals, and determine the CPU frequency based on the current CPU utilization. At this point, according to an exemplary embodiment of the present disclosure, power consumption efficiency may be controlled by lowering the maximum frequency of the CPU in accordance with the presence or absence of a polling operation and the number of I/O operations before the CPU frequency is converted.

Here, two additional concepts: Polio frequency and I/O sensitivity may be used. The Polio frequency refers to the lowermost CPU frequency showing higher performance than interrupt-based I/O when polling I/O is used. Upon determining that polling I/O is being used, the power efficiency controlling apparatus 100 converts the current maximum frequency of the CPU to a Polio frequency. The I/O sensitivity refers to a criterion based on which the power efficiency controlling apparatus 100 determines that higher performance is required, compared to when it determines based on the polling count.

If the amount of data polled by polling in the polling count exceeds n a multiple of the I/O sensitivity, the power efficiency controlling apparatus 100 may scale up the performance back to the original maximum frequency of the CPU. If the amount of data polled by polling in the polling count exceeds three times the I/O sensitivity, the power efficiency controlling apparatus 100 may increase the Polio frequency by three scales. Therefore, the power efficiency controlling apparatus 100 may utilize the performance as desired by setting the I/O sensitivity to fit the performance required by the user.

Meanwhile, the exemplary embodiments of the present disclosure built an environment in which it is possible to verify whether CPU power consumption can be reduced by lowering CPU frequency when polling I/O is performed. Linux kernel version 4.19.64 was used, and Ubuntu version 16.04.6 LTS was used. To check the I/O response time, 20 GB random write I/O was issued by using the O_DIRECT option of FIO benchmarking. Also, cpuinfo was used to measure CPU frequency, and the powercap of the sysfs module was used to measure CPU power consumption. To see how the effects vary with I/O sensitivity, a test was done at various amounts of I/O sensitivity: 100 MB, 500 MB, 1 GB, 2 GB, 5 GB, and 10 GB. The baseline refers to the conventional kernel interrupt-based I/O, and Pollo refers to the polling I/O according to the present disclosure.

Figure 5:
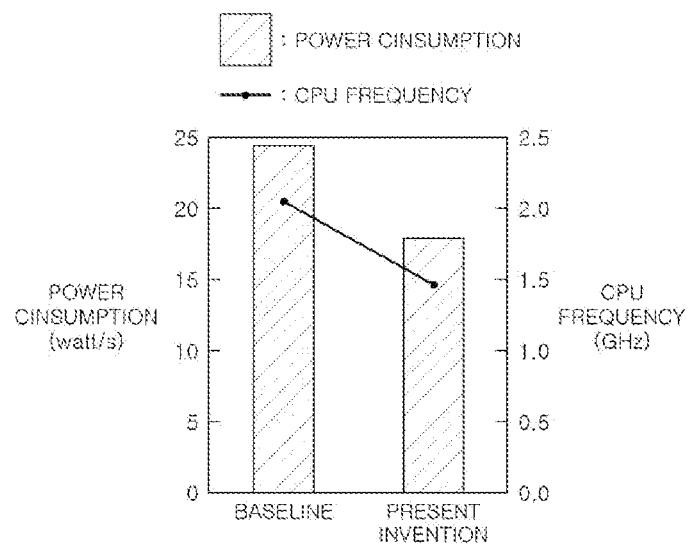
FIGS. 5 and 6 are views comparatively showing CPU power consumption and I/O response time according to an exemplary embodiment of the present disclosure and the conventional art.
Figure 6:
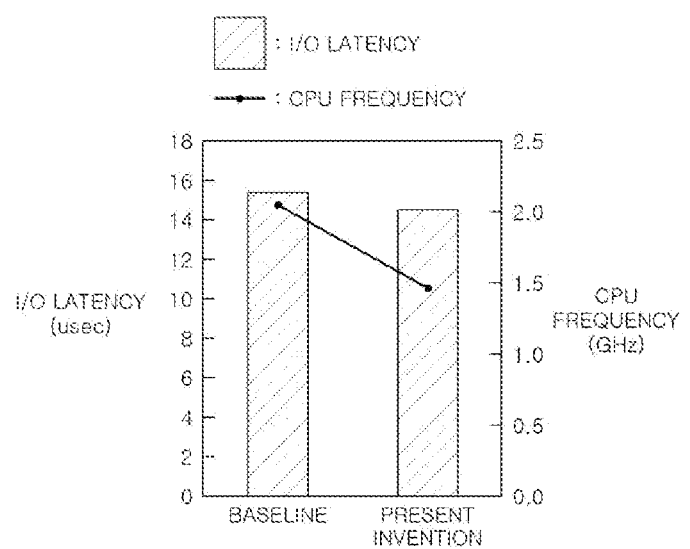

FIGS. 5 and 6 are views comparatively showing CPU power consumption and I/O response time according to an exemplary embodiment of the present disclosure and the conventional art.

A test result showed that, as in FIG. 5, the exemplary embodiment (PollO) of the present disclosure achieved lower CPU power consumption than the conventional technique. Nevertheless, as shown in FIG. 6, the exemplary embodiment (PollO) of the present disclosure showed shorter response time. This is because, as depicted in the drawings 1 and 2, the maximum CPU frequency is lowered to a predetermined Pollo frequency upon detecting a polling I/O.

Figure 7:
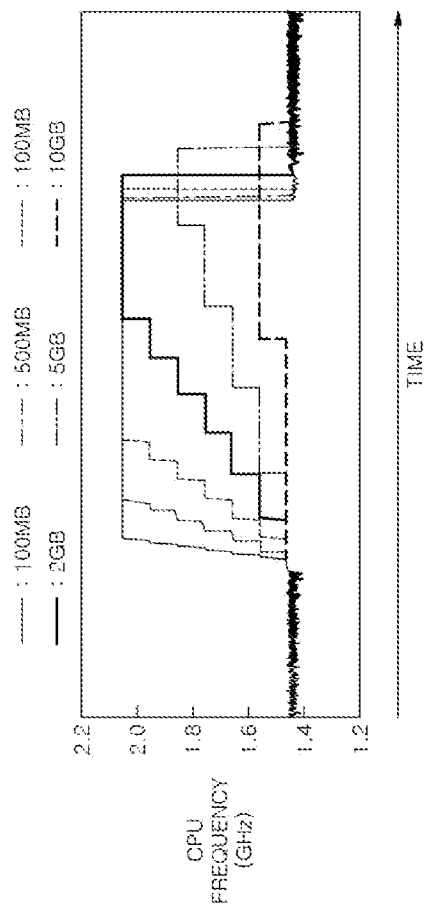
FIG. 7 is a view showing the CPU frequency for different I/O sensitivity parameters according to an exemplary embodiment of the present disclosure.

FIG. 7 is a view showing the CPU frequency for different I/O sensitivity parameters according to an exemplary embodiment of the present disclosure.

As depicted in FIG. 7, the lower the I/O sensitivity, the higher the rate of increase in CPU frequency, which allows for using high CPU frequency for a long time.

On the contrary, the higher the I/O sensitivity, the longer the usage time of low CPU frequency. Also, it can be seen that the total execution time and the total power consumption vary with I/O sensitivity.

Figure 8:
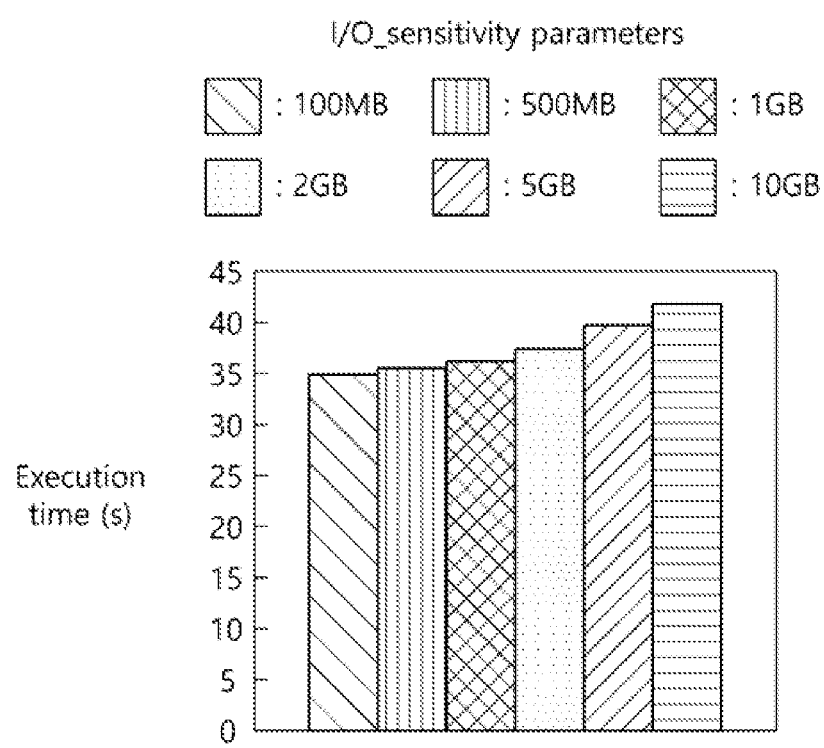
FIGS. 8 and 9 are views showing the CPU execution time and CPU power consumption for different I/O sensitivity parameters according to an exemplary embodiment of the present disclosure.
Figure 9:
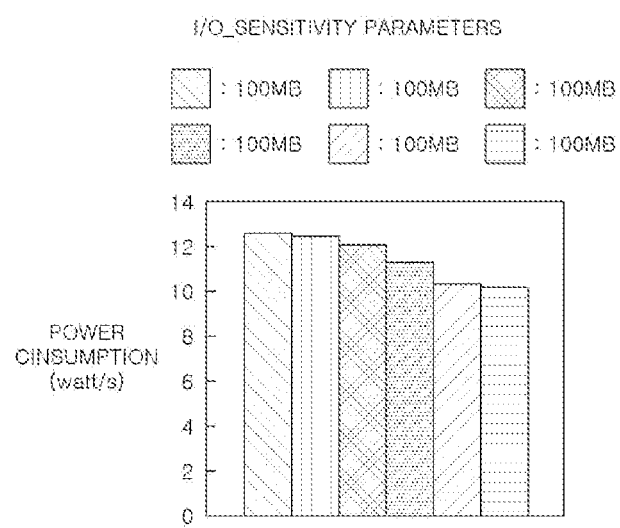

FIGS. 8 and 9 are views showing the CPU execution time and CPU power consumption for different I/O sensitivity parameters according to an exemplary embodiment of the present disclosure.

As depicted in FIG. 8, it can be seen that the lower the I/O sensitivity, the longer the usage time of high CPU frequency, which shortens the execution time.

Moreover, as depicted in FIG. 9, it can be seen that the higher the I/O sensitivity, the lower the CPU power consumption.

As such, the exemplary embodiments of the present disclosure may dynamically reduce CPU power consumption without the use of additional equipment by taking polling I/O into account. Therefore, the exemplary embodiments of the present disclosure may provide more performance and power options to mobile users.

Meanwhile, a non-transitory computer-readable storage medium may be including computer executable instructions, wherein the instructions, when executed by a processor, cause the processor to perform a method for controlling power efficiency of a processor based on polling I/O, the method comprising: checking whether a polling count is generated by a polling I/O operation for checking for the completion of an I/O request in storage, when it is checked that no polling count is generated, resetting a maximum frequency of the processor; and converting a current operation the frequency of the processor based on the polling count and an I/O sensitivity of the processor, when it is checked that the polling count is generated.

On the other hand, each of the steps included in the controlling power efficiency based on Polling I/O method according to one embodiment described above may be implemented in a computer-readable recording medium including the computer program programmed to execute each of the steps.

According to one embodiment, the above-described the controlling power efficiency based on Polling I/O apparatus and the controlling power efficiency based on Polling I/O method may be used in various fields such as a home, an industrial site, or the like, thereby having industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method for controlling power efficiency of a processor based on polling I/O, the method comprising:
    checking at every predetermined time period whether a polling count is generated by a polling I/O operation for checking for a completion in response to an I/O request in storage;
    when it is checked that no polling count is generated, resetting a maximum frequency of the processor to have a default value; and
    converting a current operation frequency of the processor based on the polling count and an I/O sensitivity of the processor, when it is checked that the polling count is generated.

2. The method of claim 1, further comprising checking whether a utilization rate of the processor exceeds a preset threshold or not.

3. The method of claim 2, wherein, said checking whether the polling count is generated is performed upon a case that the utilization rate of the processor exceeds the preset threshold.

4. The method of claim 2, further comprising resetting the polling count and the maximum frequency when the utilization rate of the processor is equal to or below the preset threshold.

5. The method of claim 1, wherein, the polling count comprises an amount of polled data, and, in the converting of the current operation frequency of the processor the maximum frequency of the processor is converted to a Pollo frequency of the processor, which is a minimum frequency of the processor having higher performance than interrupt-based I/O, when the amount of polled data is equal to or less than a natural number N multiple of the I/O sensitivity.

6. The method of claim 1, wherein, the polling count comprises an amount of polled data, and in the converting of the current operation frequency of the processor, a Pollo frequency of the processor, which is a minimum frequency of the processor showing higher performance than interrupt-based I/O, is monotonically converted N times in a stepwise manner, when the polled data exceeds a natural number N multiple of the I/O sensitivity.

7. The method of claim 6, wherein, in the converting of the current operation frequency of the processor, when the polled data exceeds the natural number N multiple of the I/O sensitivity, the Pollo frequency is converted by the multiple of the I/O sensitivity.

8. The method of claim 6, wherein as the I/O sensitivity becomes lower, an increase amount of the Pollo frequency becomes higher, and as the I/O frequency becomes higher, the increase amount of the Pollo frequency becomes lower.

9. The method of claim 1, wherein the polling count comprises information on whether one or more polling operation is detected and a number of dectected polling operations.

10. The method of claim 1, further comprising adjusting the I/O sensitivity based on a setting on the processor by a user.

11. An apparatus for controlling power efficiency of a processor based on polling I/O, the apparatus comprising:
   storage for handling an I/O request;
   memory connected to the storage;
   the processor connected to the storage and the memory, for checking whether the I/O request has been handled or not based on polling I/O; and
   a controller for adjusting a frequency of the processor,
   wherein the controller checks at every predetermined time period whether a polling count is generated by a polling I/O operation for checking for a completion in response to the I/O request in the storage, when the controller checks that no polling count is generated, resets a maximum frequency of the processor to have a default value, and converts the frequency of the processor based on the polling count and an I/O sensitivity of the processor, when the controller checks that the polling count is generated.

12. The apparatus of claim 11, wherein the controller checks whether a utilization of the processor exceeds a preset threshold or not.

13. The apparatus of claim 12, wherein, the controller checks whether the polling count is generated is performed upon a case that processor exceeds the preset threshold.

14. The apparatus of claim 12, wherein, when the utilization rate of the processor is equal to or below the preset threshold, the controller resets the polling count and the maximum frequency.

15. The apparatus of claim 11, wherein the polling count comprises an amount of polled data, and, the controller converts a maximum frequency of the processor to a Pollo frequency of the processor, which is a minimum frequency of the processor having higher performance than interrupt-based I/O, when the amount of polled data is equal to or less than a natural number N multiple of the I/O sensitivity.

16. The apparatus of claim 11, wherein, the polling count comprises an amount of polled data, and the controller converts a Pollo frequency of the processor, which is a minimum frequency of the processor showing higher performance than interrupt-based I/O, is monotonically converted in a stepwise manner, when the polled data exceeds a natural number N multiple of the I/O sensitivity.

17. The apparatus of claim 16, wherein as the I/O sensitivity becomes lower, an increase amount of the Pollo frequency becomes higher, and as the I/O frequency becomes higher, the increase amount of the Pollo frequency becomes lower.

18. The apparatus of claim 11, wherein the polling count comprises information on whether one or more polling operation is detected and a number of detected polling operations.

19. The apparatus of claim 11, wherein the controller adjusts the I/O sensitivity based on a setting on the processor by a user.

20. A non-transitory computer-readable storage medium including computer executable instructions, wherein the instructions, when executed by a processor, cause the processor to perform a method for controlling power efficiency of a processor based on polling I/O, the method comprising:
   checking at every predetermined time period whether a polling count is generated by a polling I/O operation for checking for a completion in response to an I/O request in storage;
   when it is checked that no polling count is generated, resetting a maximum frequency of the processor to have a default value; and
   converting a current operation frequency of the processor based on the polling count and an I/O sensitivity of the processor, when it is checked that the polling count is generated.

* * * * *